United States Patent
Nakao et al.

(10) Patent No.: US 8,199,792 B2
(45) Date of Patent: Jun. 12, 2012

(54) RADIO COMMUNICATION APPARATUS AND RESPONSE SIGNAL SPREADING METHOD

(75) Inventors: Seigo Nakao, Kanagawa (JP); Daichi Imamura, Kanagawa (JP); Akihiko Nishio, Kanagawa (JP); Masayuki Hoshino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/280,190

(22) Filed: Oct. 24, 2011

(65) Prior Publication Data

US 2012/0039258 A1 Feb. 16, 2012

Related U.S. Application Data

(63) Continuation of application No. 13/165,538, filed on Jun. 21, 2011, which is a continuation of application No. 12/593,904, filed as application No. PCT/JP2008/001526 on Jun. 13, 2008, now Pat. No. 8,009,721.

(30) Foreign Application Priority Data

Jun. 15, 2007 (JP) .................................. 2007-159580
Jun. 19, 2007 (JP) .................................. 2007-161966

(51) Int. Cl.
 *H04B 1/00* (2006.01)
(52) U.S. Cl. ....................................................... 375/146
(58) Field of Classification Search .................. 375/130, 375/146, 260, 295; 370/208–210
 See application file for complete search history.

(56) References Cited

U.S. PATENT DOCUMENTS

| 6,377,539 | B1 | 4/2002 | Kang et al. | |
|---|---|---|---|---|
| 7,376,117 | B2 | 5/2008 | Erlich et al. | |
| 7,539,463 | B2 | 5/2009 | Himayat et al. | |
| 7,852,959 | B2 * | 12/2010 | Kwak et al. | 375/260 |
| 7,929,415 | B2 | 4/2011 | Kwak et al. | |
| 7,957,263 | B2 * | 6/2011 | Gaal | 370/209 |
| 8,036,166 | B2 * | 10/2011 | Tiirola et al. | 370/329 |
| 2007/0171995 | A1 * | 7/2007 | Muharemovic et al. | 375/260 |
| 2007/0230600 | A1 | 10/2007 | Bertrand et al. | |

(Continued)

FOREIGN PATENT DOCUMENTS

JP 2004297593 A 10/2004

(Continued)

OTHER PUBLICATIONS

3GPP™, 3GPP TSG RAN WG1 #46bis, R1-062841, Seoul, Korea, Oct. 9-13, 2006, 7 pages.

(Continued)

*Primary Examiner* — Khanh C Tran
(74) *Attorney, Agent, or Firm* — Seed IP Law Group PLLC

(57) ABSTRACT

A wireless communication apparatus capable of minimizing the degradation in separation characteristic of a code multiplexed response signal. In this apparatus, a control part (209) controls both a AC sequence to be used in a primary spreading in a spreading part (214) and a Walsh sequence to be used in a secondary spreading in a spreading part (217) so as to allow a very small circular shift interval of the ZC sequence to absorb the interference components remaining in the response signal; the spreading part (214) uses the ZC sequence set by the control part (209) to primary spread the response signal; and the spreading part (217) uses the Walsh sequence set by the control part (209) to secondary spread the response signal to which PC has been added.

24 Claims, 15 Drawing Sheets

| WALSH SEQUENCE NUMBER(0~3) ↓ | CYCLIC SHIFT VALUE OF ZC SEQUENCE (0~11) → | | | | | | | | | | |
|---|---|---|---|---|---|---|---|---|---|---|---|
| | PUCCH #1 | | | PUCCH #2 | | | PUCCH #3 | | | | |
| | | PUCCH #4 | | | PUCCH #5 | | | PUCCH #6 | | | |
| | | | PUCCH #7 | | | PUCCH #8 | | | PUCCH #9 | | |
| | | | | PUCCH #10 | | | PUCCH #11 | | | PUCCH #12 | |

U.S. PATENT DOCUMENTS

| | | | |
|---|---|---|---|
| 2008/0212464 A1 | 9/2008 | Kim et al. |
| 2008/0232449 A1 | 9/2008 | Khan et al. |
| 2008/0268860 A1 | 10/2008 | Lunttila et al. |
| 2008/0293424 A1 | 11/2008 | Cho et al. |
| 2008/0298433 A1 | 12/2008 | Tiirola et al. |
| 2008/0298488 A1 | 12/2008 | Shen et al. |
| 2008/0310540 A1 | 12/2008 | Tiirola et al. |
| 2008/0311942 A1 | 12/2008 | Kim et al. |
| 2009/0022135 A1 | 1/2009 | Papasakellariou et al. |
| 2009/0028065 A1 | 1/2009 | Iwai et al. |
| 2009/0046646 A1 | 2/2009 | Cho et al. |
| 2010/0046480 A1 | 2/2010 | Kawamura et al. |
| 2010/0135273 A1 | 6/2010 | Kim |

FOREIGN PATENT DOCUMENTS

| | | |
|---|---|---|
| JP | 2005333344 A | 12/2005 |
| WO | 2008053930 A1 | 5/2008 |

OTHER PUBLICATIONS

3GPP™, 3GPP TSG RAN WG1 Meeting #47bis, R1-070394, Sorrento, Italy, Jan. 15-19, 2007, 5 pages.

3GPP™, 3GPP TSG RAN WG1 Meeting #48bis, R1-071650, St. Julians, Malta, Mar. 26-30, 2007, 3 pages.

"3rd Generation Partnership Project; Technical Specification Group Radio Access Network; Evolved Universal Terrestrial Radio Access (E-UTRA); Physical Channels and Modulation (Release 8)," Technical Specification 3GPP TS 36.211 (V8.3.0), 3rd Generation Partnership Project (3GPP™), Valbonne, France, May 2008.

"Coherent Uplink ACK/NAK Transmission With high Speed UEs," Report R1-072857, 3GPP TSG RAN WG1 Meeting #49, Orlando, Fla, Jun. 25-29, 2007, 6 pages.

"Coherent Uplink ACK/NAK Transmission With high Speed UEs," Report R1-073429, 3GPP TSG RAN WG1 Meeting #50, Athens, Aug. 20-24, 2007, 4 pages.

"Multiplexing Capability of CQIs and ACK/NACKs Form Different UEs," 3rd Generation Partnership Project (3GPP™) TSG RAN WG1 Meeting #49, Kobe, Japan, May 7-11, 2007, 4 pages.

"Selection of Orthogonal Cover and Syclic Shift for High Speed UL ACK," Report R1-073564, 3GPP TSG RAN WG1 Meeting #50, Athens, Aug. 20-24, 2007, 5 pages.

"Usage of Cyclic Shifts and Block-Wise Spreading Codes for Uplink ACK/NACK," Report R1-073618, 3GPP TSG RAN WG1 Meeting #50, Athens, Aug. 20-24, 2007, 5 pages.

Burstrom et al., "Uplink Control Channel in E-UTRA, Radio Link and Radio Network Evaluation," IEEE Wireless Communications and Networking Conference (WCN 2008), Las Vegas, Nev., Mar. 31-Apr. 3, 2008, pp. 835-839.

Extended European Search Report, for European Application No. 08764121.3, dated Jul. 19, 2011, 7 pages.

International Search Report, mailed Jul. 8, 2008, issued in corresponding International Application No. PCT/JP2008/001526, filed Jun. 13, 2008.

Kawamura et al., "Layer 1/Layer 2 Control Channel Structure in Single-Carrier FDMA Based Evolved UTRA Uplink," IEEE, 5 pages, 2007.

Kwak et al., "Degisn of CQI Channel Structure for Different/Large-Sized Control Signals," U.S. Appl. No. 60/944,074, filed Jun. 14, 2007, 14 pages.

Motorola, "EUTRA-SC-FDMA Uplink Pilot/References Signal Design," R1-063057, 3GPP RAN WG1 #47, Agenda Item 6.4.2, Riga, Latvia, Nov. 6-10, 2006, 5 pages.

Nokia, "Multiplexing of L1/L2 Control Signaling when UE has no data to transmit," R1-063380, 3GPP TSG RAN WG1 #47, Agenda Item 6.12.1, Riga, Latvia, Nov. 6-10, 2006, 6 pages.

Nokia Siemens Network, Nokia, "Randomization for ACK/NACK signals transmitted on PUCCH," R1-073005, 3GPP TSG RAN WG1 Meeting #49bis, Orlando, Fla, Jun. 25-29, 2007, 4 pages.

Notice of Reason for Rejection mailed Jan. 19, 2010, in corresponding Japanese Patent Application 2009-519168.

Panasonic, "Signaling parameters for UL ACK/NACK resources," R1-073616, 3GPP TSG RAN WG1 Meeting #50, Athens, Aug. 20-24, 2007, pp. 1-3.

* cited by examiner

| | Walsh 0 | Walsh 1 | Walsh 2 | Walsh 3 |
|---|---|---|---|---|
| 11 | | PUCCH #6 | | PUCCH #24 |
| 10 | PUCCH #12 | | PUCCH #18 | |
| 9 | | PUCCH #11 | | PUCCH #23 |
| 8 | PUCCH #5 | | PUCCH #17 | |
| 7 | | PUCCH #10 | | PUCCH #22 |
| 6 | PUCCH #4 | | PUCCH #16 | |
| 5 | | PUCCH #9 | | PUCCH #21 |
| 4 | PUCCH #3 | | PUCCH #15 | |
| 3 | | PUCCH #8 | | PUCCH #20 |
| 2 | PUCCH #2 | | PUCCH #14 | |
| 1 | | PUCCH #7 | | PUCCH #19 |
| 0 | PUCCH #1 | | PUCCH #13 | |

Vertical axis: CYCLIC SHIFT VALUE OF ZC SEQUENCE (0~11)
Horizontal axis: WALSH SEQUENCE NUMBER (0~3)

FIG.9

| | Walsh 0 | Walsh 1 | Walsh 2 | Walsh 3 |
|---|---|---|---|---|
| CS 11 | | PUCCH #6 | PUCCH #12 | |
| CS 10 | PUCCH #6 | | | PUCCH #24 |
| CS 9 | | PUCCH #11 | PUCCH #17 | |
| CS 8 | PUCCH #5 | | | PUCCH #23 |
| CS 7 | | PUCCH #10 | PUCCH #16 | |
| CS 6 | PUCCH #4 | | | PUCCH #22 |
| CS 5 | | PUCCH #9 | PUCCH #15 | |
| CS 4 | PUCCH #3 | | | PUCCH #21 |
| CS 3 | | PUCCH #8 | PUCCH #14 | |
| CS 2 | PUCCH #2 | | | PUCCH #20 |
| CS 1 | | PUCCH #7 | PUCCH #13 | |
| CS 0 | PUCCH #1 | | | PUCCH #19 |

CYCLIC SHIFT VALUE OF ZC SEQUENCE (0~11)

WALSH SEQUENCE NUMBER (0~3)

FIG.10

| | | PUCCH #18 | PUCCH #24 |
|---|---|---|---|
| PUCCH #6 | PUCCH #12 | | |
| | | PUCCH #17 | PUCCH #23 |
| PUCCH #5 | PUCCH #11 | | |
| | | PUCCH #16 | PUCCH #22 |
| PUCCH #4 | PUCCH #10 | | |
| | | PUCCH #15 | PUCCH #21 |
| PUCCH #3 | PUCCH #9 | | |
| | | PUCCH #14 | PUCCH #20 |
| PUCCH #2 | PUCCH #8 | | |
| | | PUCCH #13 | PUCCH #19 |
| PUCCH #1 | PUCCH #7 | | |

CYCLIC SHIFT VALUE OF ZC SEQUENCE (0~11)

WALSH SEQUENCE NUMBER (0~3)

FIG.12

RADIO COMMUNICATION APPARATUS AND RESPONSE SIGNAL SPREADING METHOD

TECHNICAL FIELD

The present invention relates to a radio communication apparatus and a reference signal generating method.

BACKGROUND ART

In mobile communication, ARQ (Automatic Repeat Request) is applied to downlink data from a radio communication base station apparatus (hereinafter abbreviated to "base station") to radio communication mobile station apparatuses (hereinafter abbreviated to "mobile stations"). That is, mobile stations feed back response signals representing error detection results of downlink data, to the base station. Mobile stations perform a CRC (Cyclic Redundancy Check) of downlink data, and, if CRC=OK is found (i.e. if no error is found), feed back an ACK (ACKnowledgement), and, if CRC=NG is found (i.e. if error is found), feed back a NACK (Negative ACKnowledgement), as a response signal to the base station. These response signals are transmitted to the base station using uplink control channels such as a PUCCH (Physical Uplink Control CHannel).

Also, the base station transmits control information for reporting resource allocation results of downlink data, to mobile stations. This control information is transmitted to the mobile stations using downlink control channels such as L1/L2 CCHs (L1/L2 Control CHannels). Each L1/L2 CCH occupies one or a plurality of CCEs (Control Channel Elements). If one L1/L2 CCH occupies a plurality of CCEs, the plurality of CCEs occupied by the L1/L2 CCH are consecutive. Based on the number of CCEs required to carry control information, the base station allocates an arbitrary L1/L2 CCH among the plurality of L1/L2 CCHs to each mobile station, maps the control information on the physical resources corresponding to the CCEs occupied by the L1/L2 CCH, and performs transmission.

Also, to efficiently use downlink communication resources, studies are underway to associate CCEs with PUCCHs. According to this association, each mobile station can decide the PUCCH to use to transmit response signals from the mobile station, from the CCEs corresponding to physical resources on which control information for the mobile station is mapped.

Also, as shown in FIG. 1, studies are underway to perform code-multiplexing by spreading a plurality of response signals from a plurality of mobile stations using ZC (Zadoff-Chu) sequences and Walsh sequences (see Non-Patent Document 1). In FIG. 1, ($W_0$, $W_1$, $W_2$, $W_3$) represents a Walsh sequence with a sequence length of 4. As shown in FIG. 1, in a mobile station, first, a response signal of ACK or NACK is subject to first spreading to one symbol by a ZC sequence (with a sequence length of 12) in the frequency domain. Next, the response signal subjected to first spreading is subject to an IFFT (Inverse Fast Fourier Transform) in association with $W_0$ to $W_3$. The response signal spread in the frequency domain by a ZC sequence with a sequence length of 12 is transformed to a ZC sequence with a sequence length of 12 by this IFFT in the time domain. Then, the signal subjected to the IFFT is subject to second spreading using a Walsh sequence (with a sequence length of 4). That is, one response signal is allocated to each of four symbols $S_0$ to $S_3$. Similarly, response signals of other mobile stations are spread using ZC sequences and Walsh sequences. Here, different mobile stations use ZC sequences with different cyclic shift values in the time domain, or different Walsh sequences. Here, the sequence length of ZC sequences in the time domain is 12, so that it is possible to use twelve ZC sequences with cyclic shift values "0" to "11", generated by cyclically shifting the same ZC sequence using the cyclic shift values "0" to "11". Also, the sequence length of Walsh sequences is 4, so that it is possible to use four different Walsh sequences. Therefore, in an ideal communication environment, it is possible to code-multiplex maximum forty-eight (12×4) response signals from mobile stations.

Here, there is no cross-correlation between ZC sequences with different cyclic shift values generated from the same ZC sequence. Therefore, in an ideal communication environment, as shown in FIG. 2, a plurality of response signals subjected to spreading and code-multiplexing by ZC sequences with different cyclic shift values (0 to 11), can be separated in the time domain without inter-code interference, by correlation processing in the base station.

However, due to an influence of, for example, transmission timing difference in mobile stations, multipath delayed waves and frequency offsets, a plurality of response signals from a plurality of mobile stations do not always arrive at a base station at the same time. For example, as shown in FIG. 3, if the transmission timing of a response signal spread by the ZC sequence with cyclic shift value "0" is delayed from the correct transmission timing, the correlation peak of the ZC sequence with cyclic shift value "0" may appear in the detection window for the ZC sequence with cyclic shift value "1." Further, as shown in FIG. 4, if a response signal spread by the ZC sequence with cyclic shift value "0" has a delay wave, an interference leakage due to the delayed wave may appear in the detection window for the ZC sequence with cyclic shift value "1." Therefore, in these cases, the separation performance degrades between a response signal spread by the ZC sequence with cyclic shift value "0" and a response signal spread by the ZC sequence with cyclic shift value "1." That is, if ZC sequences, cyclic shift values of which are adjacent, are used, the separation performance of response signals may degrade.

Therefore, up till now, if a plurality of response signals are code-multiplexed by spreading using ZC sequences, a sufficient cyclic shift value difference (i.e. cyclic shift interval) is provided between the ZC sequences, to an extent that does not cause inter-code interference between the ZC sequences. For example, when the difference between the cyclic shift values of ZC sequences is 4, only three ZC sequences with cyclic shift values "0," "4," and "8" amongst twelve ZC sequences with cyclic shift values "0" to "11," are used for the first spreading of response signals. Therefore, if Walsh sequences with a sequence length of 4 are used for second spreading of response signals, it is possible to code-multiplex maximum twelve (3×4) response signals from mobile stations.

Non-Patent Document 1: Multiplexing capability of CQIs and ACK/NACKs form different UEs (ftp://ftp.3gpp.org/TSG_RAN/WG1_RL1/TSGR1_49/Docs/R1-072315.zip)

DISCLOSURE OF INVENTION

Problems to be Solved by the Invention

As described above, if a Walsh sequence with a sequence length of 4, ($W_0$, $W_1$, $W_2$, $W_3$), is used for second spreading, one response signal is allocated to each of four symbols ($S_0$ to $S_3$). Therefore, a base station that receives response signals from mobile stations needs to despread the response signals over a time period of four-symbols. On the other hand, if a mobile station moves fast, there is a high possibility that the channel conditions between the mobile station and the base station change during the above four-symbol time period. Therefore, when there is a mobile station moving fast, orthogonality between Walsh sequences that are used for second spreading may collapse. That is, when there are mobile stations moving fast, inter-code interference is more likely to occur between Walsh sequences than between ZC sequences, and, as a result, the separation performance of response signals degrades.

By the way, when some of a plurality of mobile stations moves fast and the rest of mobile stations are in a stationary state, the mobile stations in a stationary state, which are multiplexed with the mobile stations moving fast on the Walsh axis, are also influenced by inter-code interference.

It is therefore an object of the present invention to provide a radio communication apparatus and reference signal generating method that can minimize degradation of the separation performance of response signals that are code-multiplexed.

Means for Solving the Problem

The radio communication apparatus of the present invention employs a configuration having: a first spreading section that performs first spreading of a response signal using one of a plurality of first sequences that can be separated from each other because of different cyclic shift values; and a second spreading section that performs second spreading of the response signal subjected to the first spreading, using one of a plurality of second sequences, and in which a difference between cyclic shift values of first sequences associated with different, adjacent second sequences, is less than a difference between cyclic shift values of first sequences associated with the same second sequence.

Advantageous Effect of Invention

According to the present invention, it is possible to minimize degradation of the separation performance of response signals that are code-multiplexed.

BRIEF DESCRIPTION OF DRAWINGS

FIG. 9 is a diagram showing association between ZC sequences, Walsh sequences and PUCCHs according to Embodiment 1 of the present invention (variation 2);

FIG. 10 is a diagram showing association between ZC sequences, Walsh sequences and PUCCHs according to Embodiment 1 of the present invention (variation 3);

FIG. 12 is a diagram showing association between ZC sequences, Walsh sequences and PUCCHs according to Embodiment 2 of the present invention;

BEST MODE FOR CARRYING OUT INVENTION

Embodiments of the present invention will be explained below in detail with reference to the accompanying drawings.
(Embodiment 1)

Figure 5:
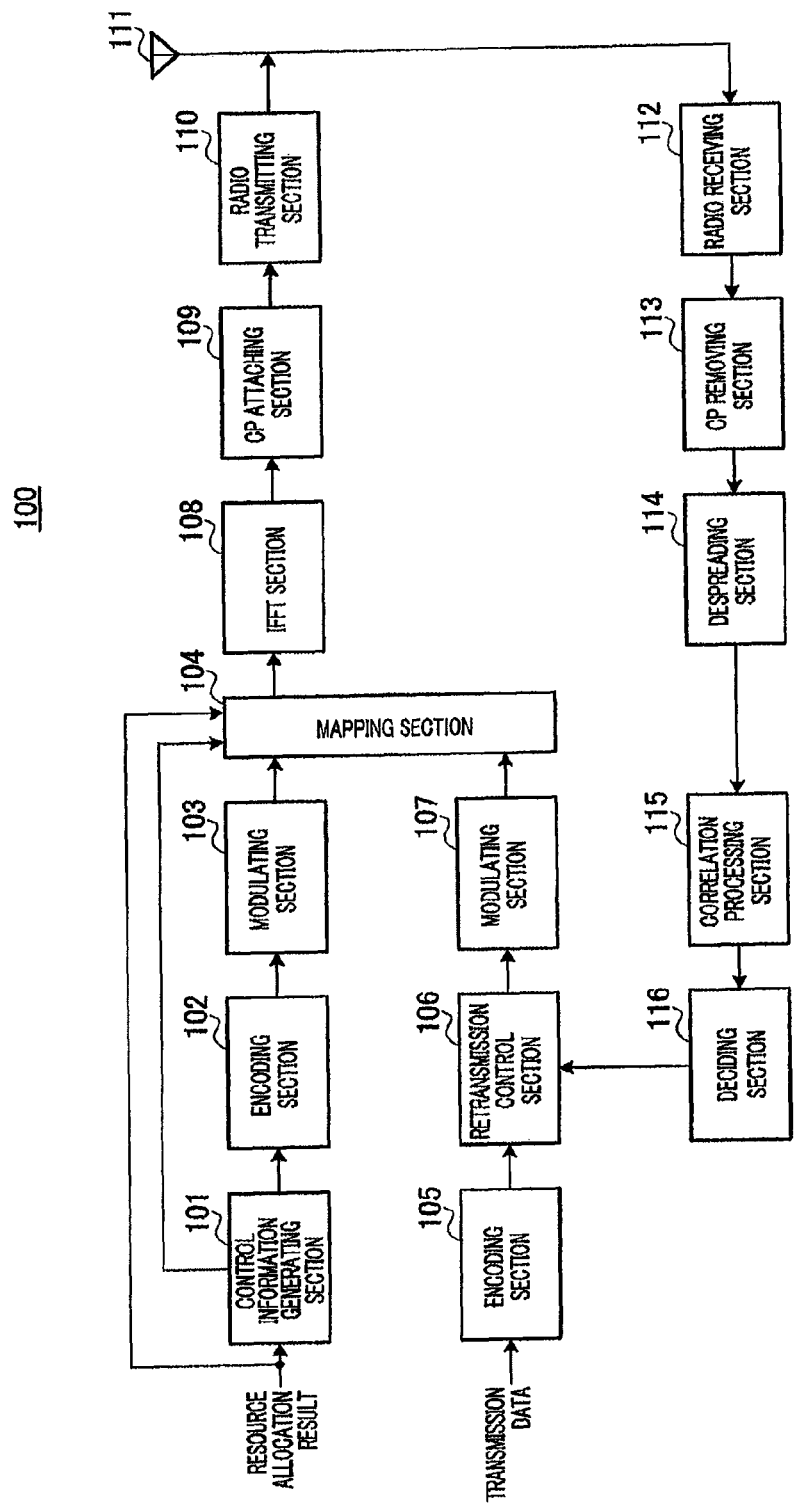
FIG. 5 is a block diagram showing the configuration of a base station according to Embodiment 1 of the present invention.
Figure 6:
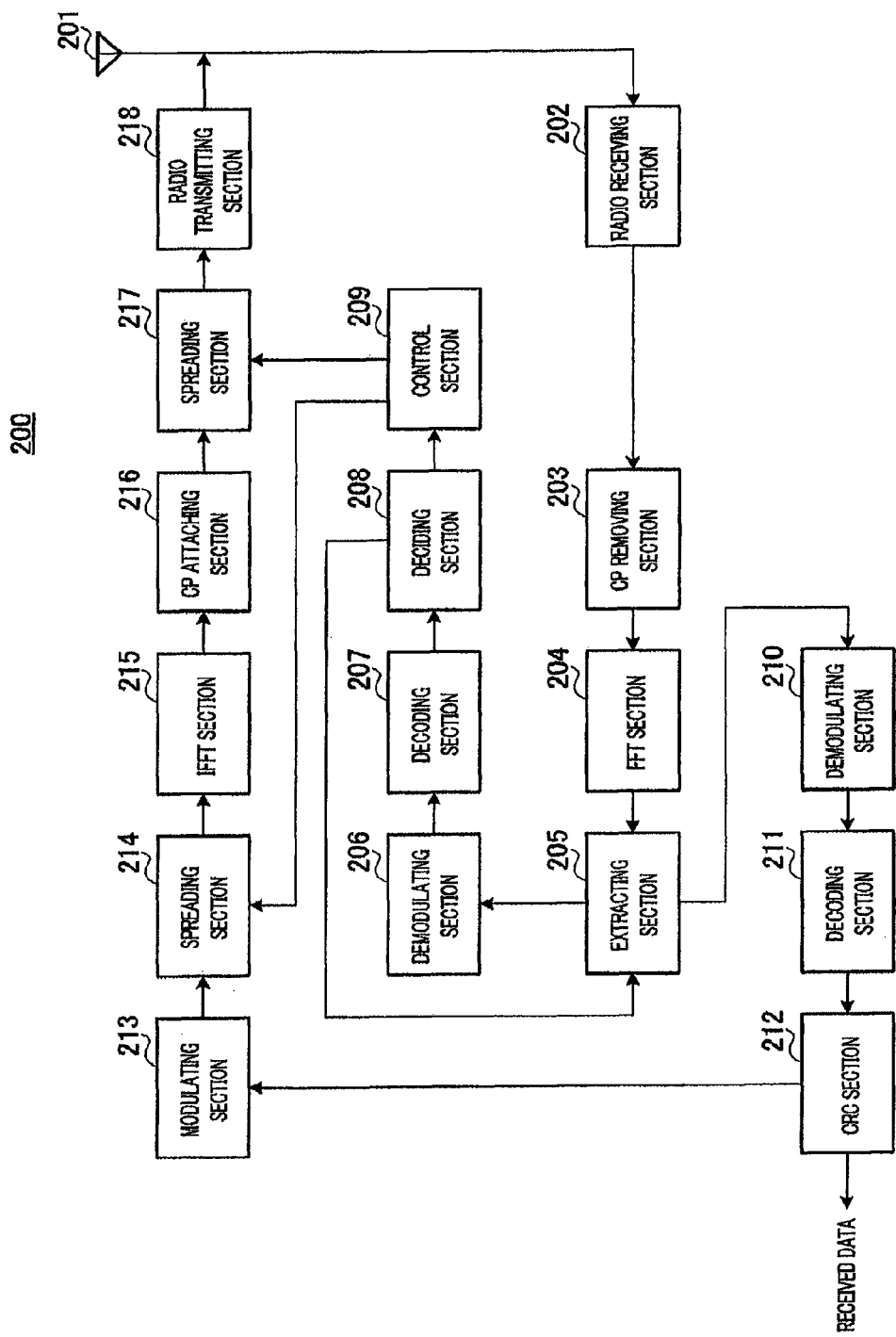
FIG. 6 is a block diagram showing the configuration of a mobile station according to Embodiment 1 of the present invention.

FIG. 5 illustrates the configuration of base station 100 according to the present embodiment, and FIG. 6 illustrates the configuration of mobile station 200 according to the present embodiment.

Here, to avoid complicated explanation, FIG. 5 illustrates components associated with transmission of downlink data and components associated with reception of uplink response signals to downlink data, which are closely related to the present invention, and illustration and explanation of the components associated with reception of uplink data will be omitted. Similarly, FIG. 6 illustrates components associated with reception of downlink data and components associated with transmission of uplink response signals to downlink data, which are closely related to the present invention, and illustration and explanation of the components associated with transmission of uplink data will be omitted.

Also, in the following explanation, a case will be described where ZC sequences are used for first spreading and Walsh sequences are used for second spreading. Here, for first spreading, it is equally possible to use sequences, which can be separated from each other because of different cyclic shift values, other than ZC sequences. Similarly, for second spreading, it is equally possible to use orthogonal sequences other than Walsh sequences.

Further, in the following explanation, a case will be described where ZC sequences with a sequence length of 12 and Walsh sequences with a sequence length of 4, ($W_0$, $W_1$, $W_2$, $W_3$), are used. However, the present invention is not limited to these sequence lengths.

Further, in the following explanation, twelve ZC sequences with cyclic shift values "0" to "11" will be referred to as "ZC #0" to "ZC #11," and four Walsh sequences of sequence numbers "0" to "3" will be referred to as "W #0" to "W #3."

Further, a case will be assumed in the following explanation where L1/L2 CCH #1 occupies CCE #1, L1/L2 CCH #2 occupies CCE #2, L1/L2 CCH #3 occupies CCE #3, L1/L2 CCH #4 occupies CCE #4 and CCE #5, L1/L2 CCH #5 occupies CCE #6 and CCE #7, L1/L2 CCH #6 occupies CCEs #8 to #11, and so on.

Further, in the following explanation, the CCE numbers and the PUCCH numbers, which are defined by the cyclic shift values of ZC sequences and Walsh sequence numbers, are associated therebetween on a one to one basis. That is, CCE #1 is associated with PUCCH #1, CCE #2 is associated with PUCCH #2, CCE #3 is associated with PUCCH #3, and so on.

In base station 100 shown in FIG. 5, control information generating section 101 and mapping section 104 receive as input a resource allocation result of downlink data.

Control information generating section 101 generates control information to carry the resource allocation result, on a per mobile station basis, and outputs the control information to encoding section 102. Control information, which is provided per mobile station, includes mobile station ID information to indicate to which mobile station the control information is directed. For example, control information includes, as mobile station ID information, a CRC masked by the ID number of the mobile station, to which control information is reported. Control information is encoded in encoding section 102, modulated in modulating section 103 and received as input in mapping section 104, on a per mobile station basis. Further, control information generating section 101 allocates an arbitrary L1/L2 CCH in a plurality of L1/L2 CCHs to each mobile station, based on the number of CCE(s) required to report the control information, and outputs the CCE number corresponding to the allocated L1/L2 CCH to mapping section 104. For example, when the number of CCE(s) required to report control information to mobile station #1 is one and therefore L1/L2 CCH #1 is allocated to mobile station #1, control information generating section 101 outputs CCE number #1 to mapping section 104. Also, when the number of CCE(s) required to report control information to mobile station #1 is four and therefore L1/L2 CCH #6 is allocated to mobile station #1, control information generating section 101 outputs CCE numbers #8 to #11, to mapping section 104.

On the other hand, encoding section 105 encodes transmission data for each mobile station (i.e. downlink data) and outputs the encoded transmission data to retransmission control section 106.

Upon initial transmission, retransmission control section 106 holds the encoded transmission data on a per mobile station basis and outputs the data to modulating section 107. Retransmission control section 106 holds transmission data until retransmission control section 106 receives as input an ACK of each mobile station from deciding section 116. Further, upon receiving as input a NACK of each mobile station from deciding section 116, that is, for retransmission, retransmission control section 106 outputs the transmission data associated with that NACK to modulating section 107.

Modulating section 107 modulates the encoded transmission data received as input from retransmission control section 106, and outputs the result to mapping section 104.

For transmission of control information, mapping section 104 maps the control information received as input from modulating section 103 on a physical resource based on the CCE number received as input from control information generating section 101, and outputs the result to IFFT section 108. That is, mapping section 104 maps control information on the subcarrier corresponding to the CCE number in a plurality of subcarriers comprised of an OFDM symbol, on a per mobile station basis.

On the other hand, for transmission of downlink data, mapping section 104 maps the transmission data, which is provided on a per mobile station basis, on a physical resource based on the resource allocation result, and outputs the result to IFFT section 108. That is, based on the resource allocation result, mapping section 104 maps transmission data on a subcarrier in a plurality of subcarriers comprised of an OFDM symbol, on a per mobile station basis.

IFFT section 108 generates an OFDM symbol by performing an IFFT of a plurality of subcarriers on which control information or transmission data is mapped, and outputs the OFDM symbol to CP (Cyclic Prefix) attaching section 109.

CP attaching section 109 attaches the same signal as the signal at the tail end part of the OFDM symbol, to the head of the OFDM symbol as a CP.

Radio transmitting section 110 performs transmission processing such as D/A conversion, amplification and up-conversion on the OFDM symbol with a CP, and transmits the result from antenna 111 to mobile station 200 (in FIG. 6).

On the other hand, radio receiving section 112 receives a response signal transmitted from mobile station 200, via antenna 111, and performs receiving processing such as down-conversion and ND conversion on the response signal.

CP removing section 113 removes the CP attached to the response signal subjected to receiving processing.

Despreading section 114 despreads the response signal by a Walsh sequence that is used for second spreading in mobile station 200, and outputs the despread response signal to correlation processing section 115.

Correlation processing section 115 finds the correlation value between the response signal received as input from dispreading section 114, that is, the response signal spread by a ZC sequence, and the ZC sequence that is used for first spreading in mobile station 200, and outputs the correlation value to deciding section 116.

Deciding section 116 detects a correlation peak on a per mobile station basis, using a detection window set per mobile station in the time domain, thereby detecting a response signal on a per mobile station basis. For example, upon detecting a correlation peak in detection window #1 for mobile station #1, deciding section 116 detects the response signal from mobile station #1. Then, deciding section 116 decides whether the detected response signal is an ACK or NACK, and outputs the ACK or NACK to retransmission control section 106 on a per mobile station basis.

On the other hand, in mobile station 200 shown in FIG. 6, radio receiving section 202 receives the OFDM symbol transmitted from base station 100, via antenna 201, and performs receiving processing such as down-conversion and ND conversion on the OFDM symbol.

CP removing section 203 removes the CP attached to the OFDM symbol subjected to receiving processing.

FFT (Fast Fourier Transform) section 204 acquires control information or downlink data mapped on a plurality of subcarriers by performing a FFT of the OFDM symbol, and outputs the control information or downlink data to extracting section 205.

For receiving the control information, extracting section 205 extracts the control information from the plurality of subcarriers and outputs it to demodulating section 206. This control information is demodulated in demodulating section 206, decoded in decoding section 207 and received as input in deciding section 208.

On the other hand, for receiving downlink data, extracting section 205 extracts the downlink data directed to the mobile station from the plurality of subcarriers, based on the resource allocation result received as input from deciding section 208, and outputs the downlink data to demodulating section 210. This downlink data is demodulated in demodulating section 210, decoded in decoding section 211 and received as input in CRC section 212.

CRC section 212 performs an error detection of the decoded downlink data using a CRC, generates an ACK in the case of CRC=OK (i.e. when no error is found) and a NACK in the case of CRC=NG (i.e. when error is found), as a response signal, and outputs the generated response signal to modulating section 213. Further, in the case of CRC=OK (i.e. when no error is found), CRC section 212 outputs the decoded downlink data as received data.

Deciding section 208 performs a blind detection of whether or not the control information received as input from decoding section 207 is directed to the mobile station. For example, deciding section 208 decides that, if CRC=OK is found (i.e. if no error is found) as a result of demasking by the ID number of the mobile station, the control information is directed to the mobile station. Further, deciding section 208 outputs the control information directed to the mobile station, that is, the resource allocation result of downlink data for the mobile station, to extracting section 205. Further, deciding section 208 decides a PUCCH to use to transmit a response signal from the mobile station, from the CCE number corresponding to subcarriers on which the control information directed to the mobile station is mapped, and outputs the decision result (i.e. PUCCH number) to control section 209. For example, if control information is mapped on a subcarrier corresponding to CCE #1, deciding section 208 of mobile station 200 allocated with above L1/L2 CCH #1 decides that PUCCH #1 associated with CCE #1 is the PUCCH for the mobile station. For example, if control information is mapped on subcarriers corresponding to CCE #8 to CCE #11, deciding section 208 of mobile station 200 allocated with above L1/L2 CCH #6 decides that PUCCH #8 associated with CCE #8, which is the minimum number among CCE #8 to CCE #11, is the PUCCH directed to the mobile station.

Based on the PUCCH number received as input from deciding section 208, control section 209 controls the cyclic shift value of the ZC sequence that is used for first spreading in spreading section 214 and the Walsh sequence that is used for second spreading in spreading section 217. That is, control section 209 sets a ZC sequence, the cyclic shift value of which is associated with the PUCCH number received as input from deciding section 208, in spreading section 214, and sets the Walsh sequence associated with the PUCCH number received as input from deciding section 208, in spreading section 217. The sequence control in control section 209 will be described later in detail.

Modulating section 213 modulates the response signal received as input from CRC section 212 and outputs the result to spreading section 214.

Figure 1:
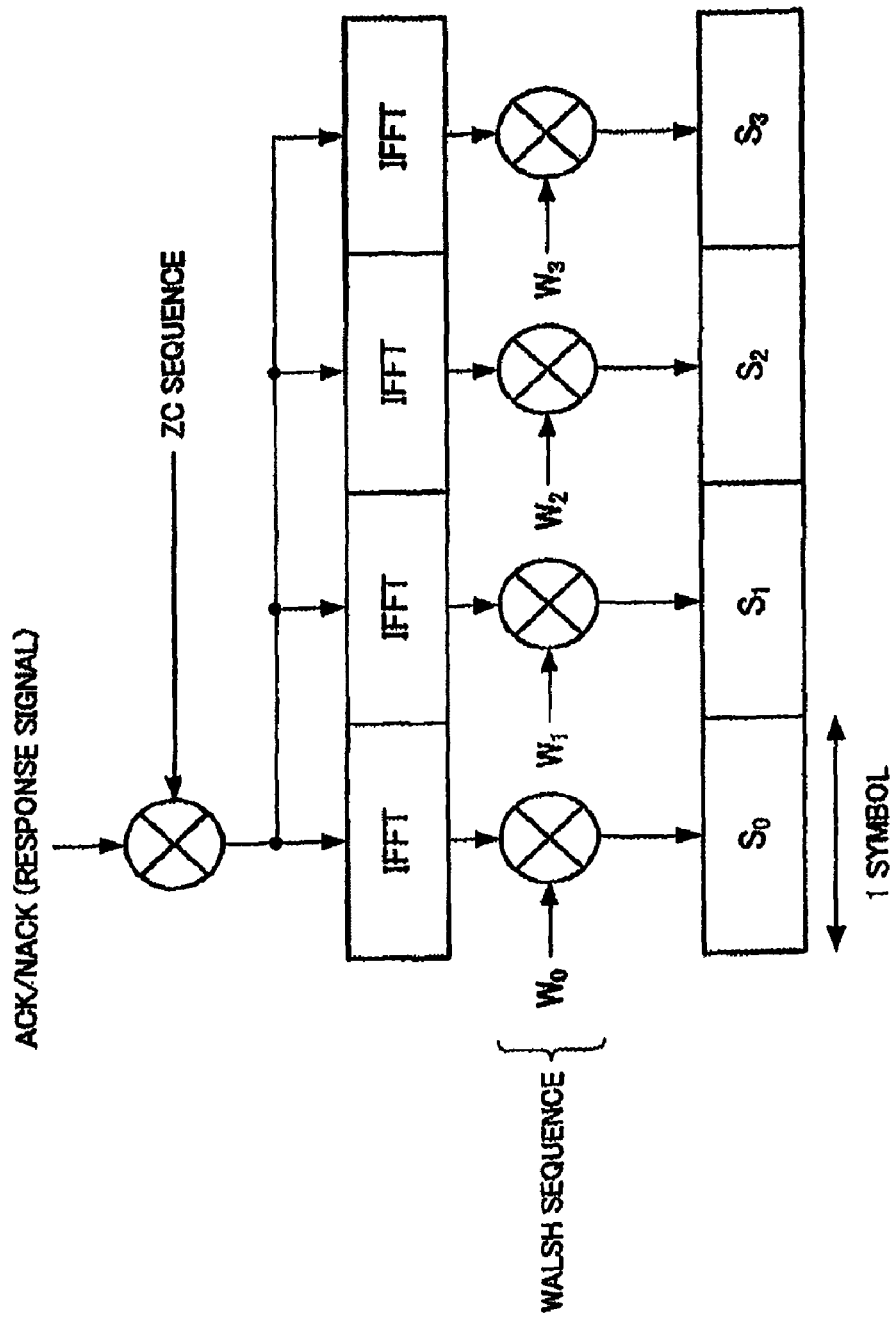
FIG. 1 is a diagram showing a spreading method of response signals (prior art)
Figure 2:
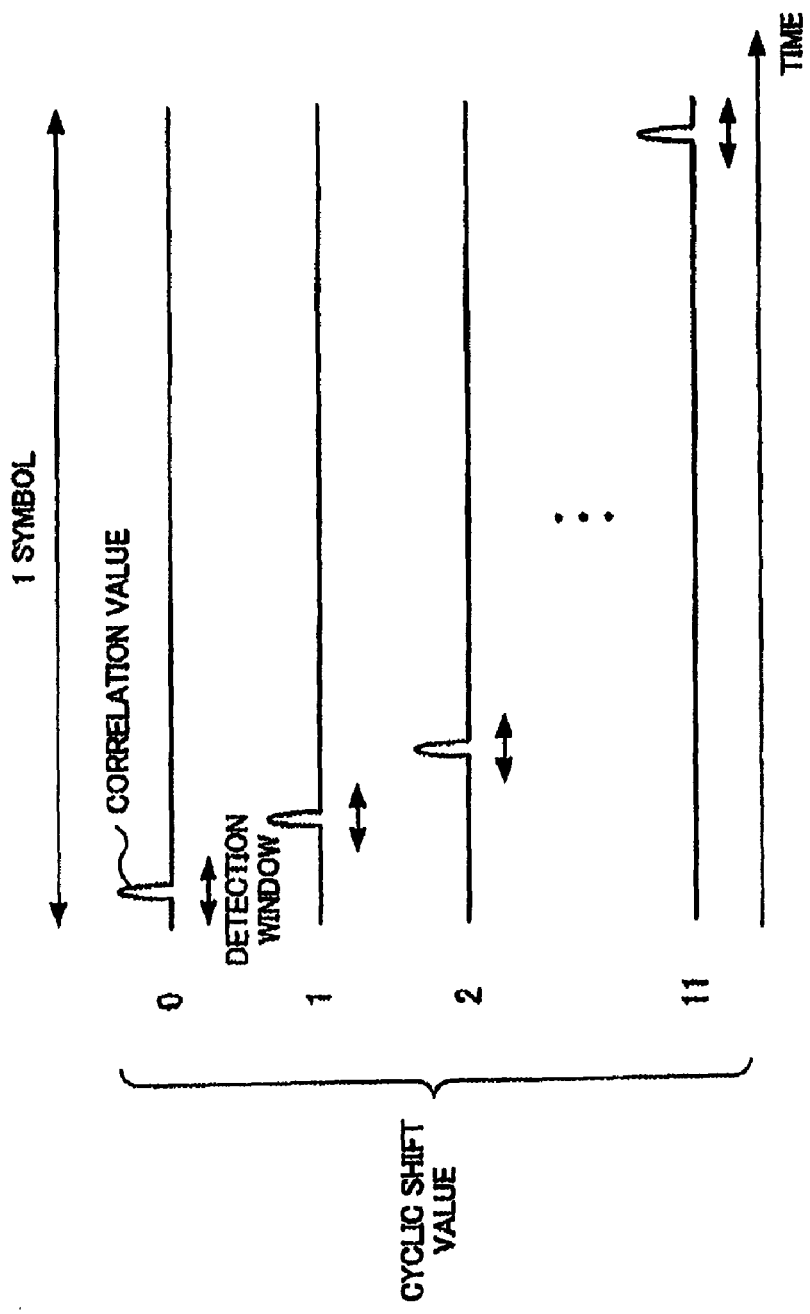
FIG. 2 is a diagram showing correlation processing of response signals spread by ZC sequences (in the case of an ideal communication environment)
Figure 3:
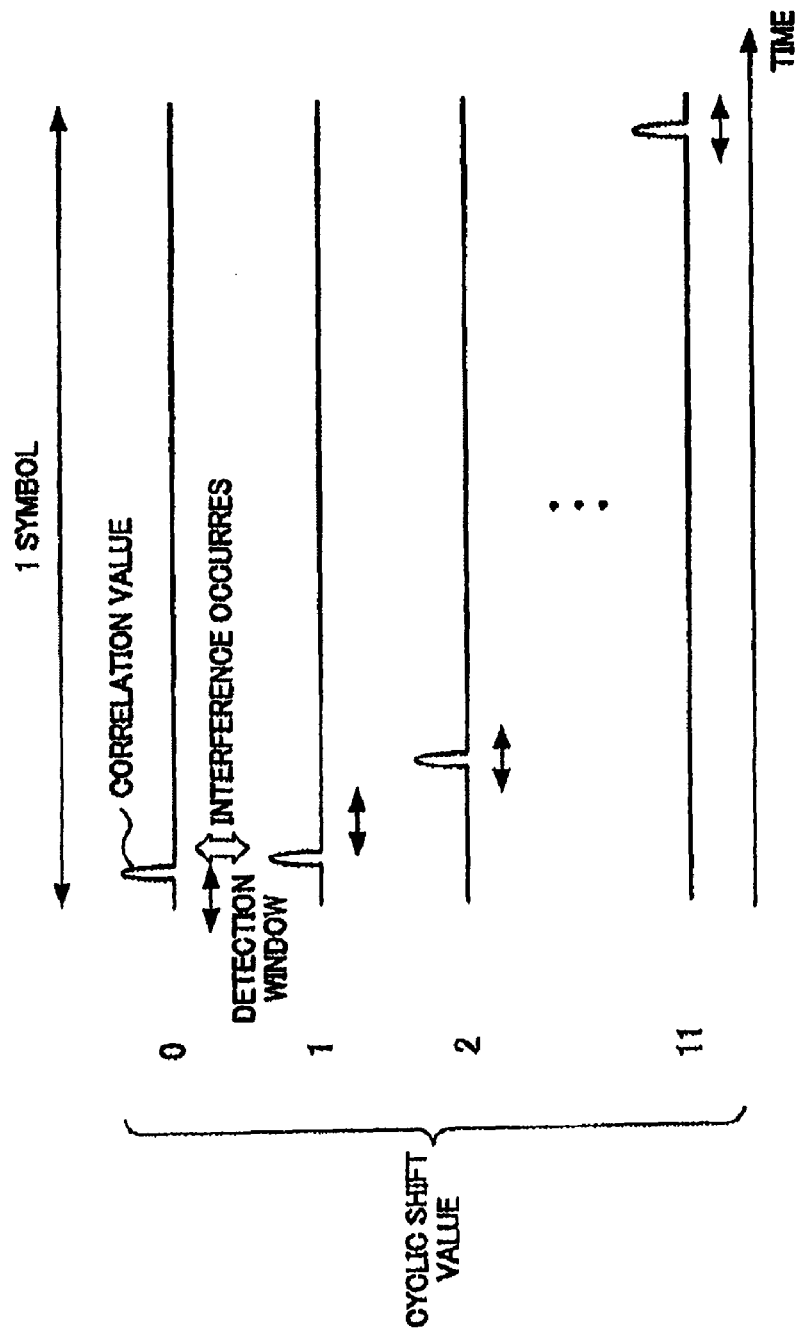
FIG. 3 is a diagram showing correlation processing of response signals spread by ZC sequences (when there is a transmission timing difference)
Figure 4:
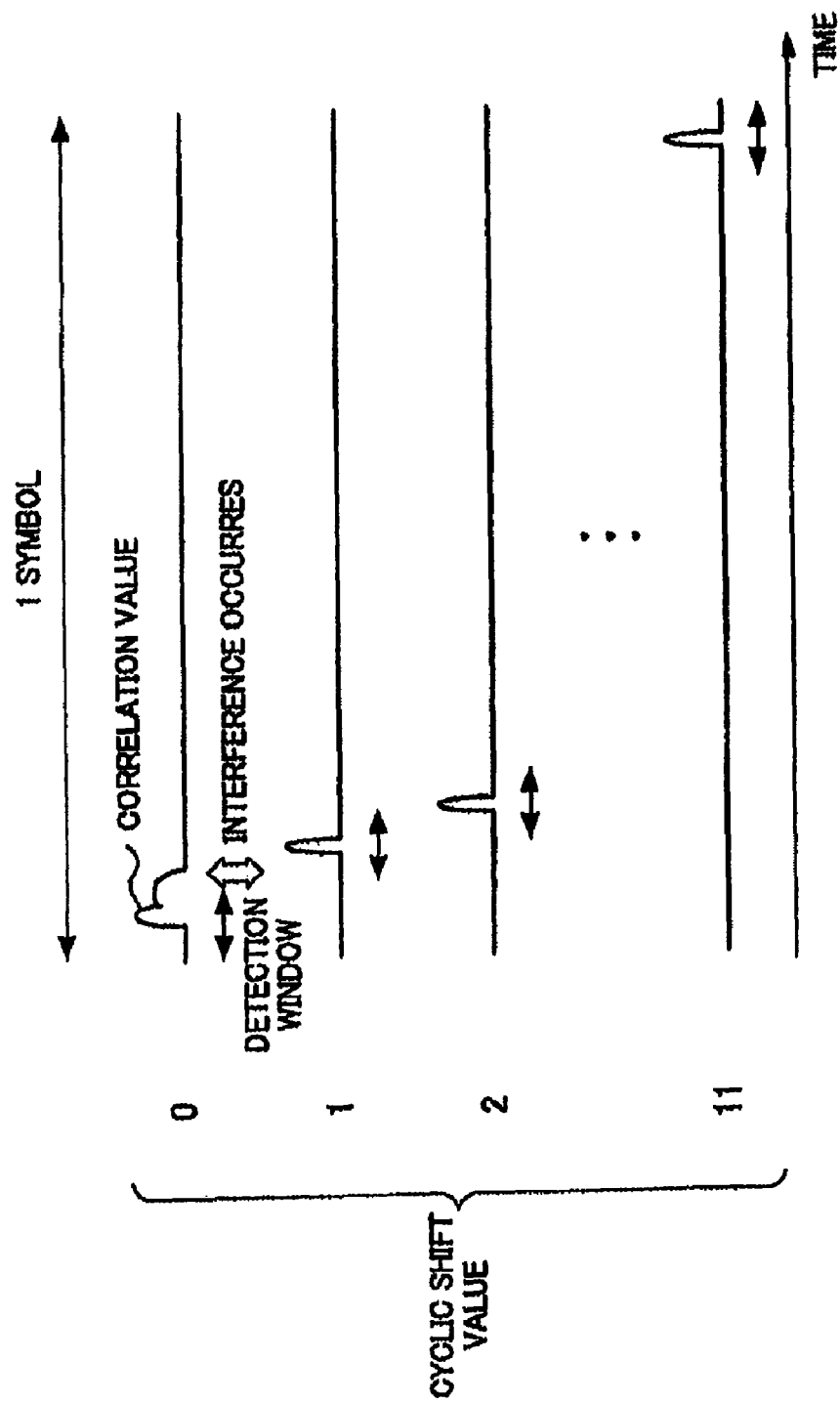
FIG. 4 is a diagram showing correlation processing of response signals spread by ZC sequences (when there is a delay wave)

As shown in FIG. 1, spreading section 214 performs first spreading of the response signal by the ZC sequence set in control section 209, and outputs the response signal subjected to first spreading to IFFT section 215.

As shown in FIG. 1, IFFT section 215 performs an IFFT of the response signal subjected to first spreading, and outputs the response signal subjected to an IFFT to CP attaching section 216.

CP attaching section 216 attaches the same signal as the tail end part of the response signal subjected to an IFFT, to the head of the response signal as a CP.

As shown in FIG. 1, spreading section 217 performs second spreading of the response signal with a CP by the Walsh sequence set in control section 209, and outputs the response signal subjected to second spreading to radio transmitting section 218.

Radio transmitting section 218 performs transmission processing such as D/A conversion, amplification and up-conversion on the response signal subjected to second spreading, and transmits the resulting signal from antenna 201 to base station 100 (in FIG. 5).

According to the present embodiment, a response signal is subjected to two-dimensional spreading, by first spreading using a ZC sequence and second spreading using a Walsh sequence. That is to say, the present embodiment spreads a response signal on the cyclic shift axis and on the Walsh axis.

Next, sequence control in control section 209 (in FIG. 6) will be explained in detail.

If ZC sequences are used for first spreading of a response signal, as described above, a sufficient cyclic shift value difference (e.g. cyclic shift value difference of 4) is provided between the ZC sequences, to an extent that does not cause inter-code interference between the ZC sequences. Therefore, orthogonality between response signals subjected to first spreading using ZC sequences, cyclic shift values of which are different, is little likely to collapse. By contrast, as described above, when there is a mobile station moving fast, orthogonality between Walsh sequences used for second spreading is likely to collapse.

Figure 7:
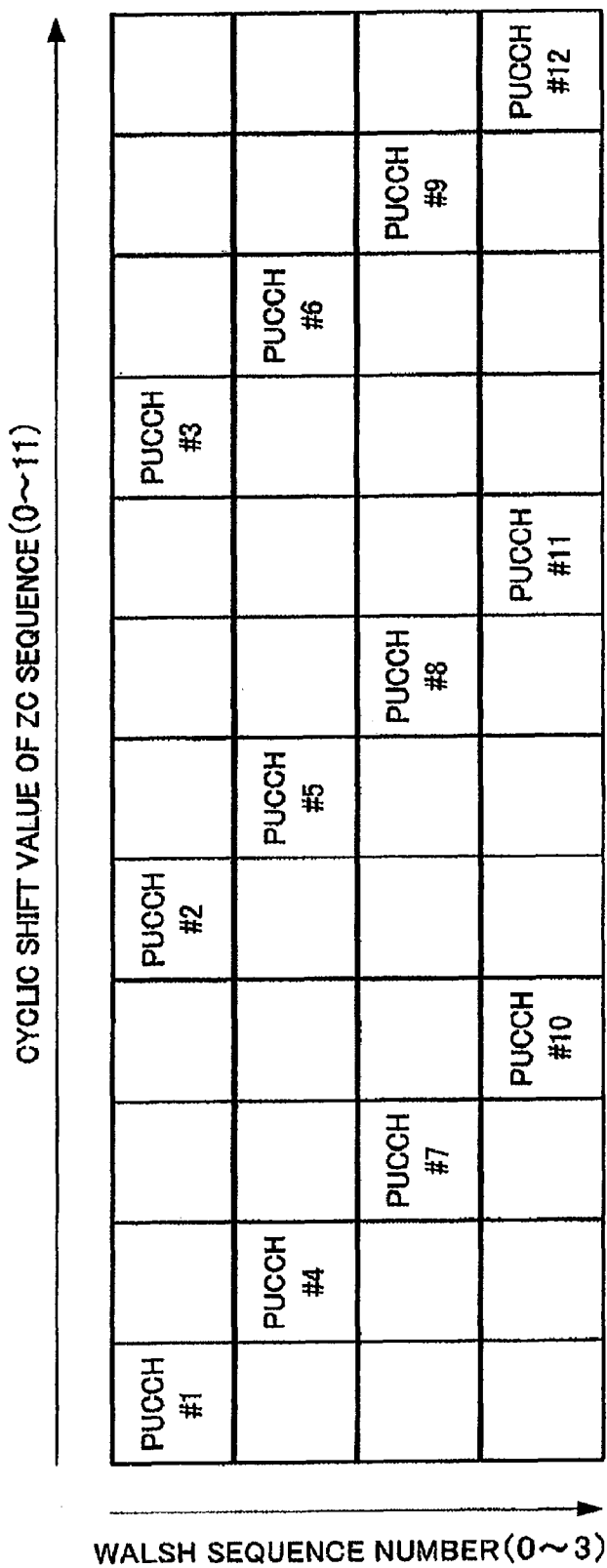
FIG. 7 is a diagram showing association between ZC sequences, Walsh sequences and PUCCHs according to Embodiment 1 of the present invention (variation 1)

Therefore, the present embodiment controls ZC sequences and Walsh sequences according to the association shown in FIG. 7, such that interference components remained in response signals subjected to despreading in despreading section 114 (in FIG. 5) are absorbed by a slight difference between the cyclic shift values of ZC sequences. That is, control section 209 controls the cyclic shift values of ZC sequences that are used for first spreading in spreading section 214 and Walsh sequences that are used for second spreading in spreading section 217, according to the association shown in FIG. 7.

FIG. 7 associates PUCCH #1 with ZC #0 and W #0, PUCCH #2 with ZC #4 and W #0, PUCCH #3 with ZC #8 and W #0, PUCCH #4 with ZC #1 and W #1, PUCCH #5 with ZC #5 and W #1, PUCCH #6 with ZC #9 and W #1, PUCCH #7 with ZC #2 and W #2, PUCCH #8 with ZC #6 and W #2, PUCCH #9 with ZC #10 and W #2, PUCCH #10 with ZC #3 and W #3, PUCCH #11 with ZC #7 and W #3, and PUCCH #12 with ZC #11 and W #3.

Therefore, for example, upon receiving as input PUCCH number #1 from deciding section 208, control section 209 sets ZC #0 in spreading section 214 and W #0 in spreading section 217. Also, for example, upon receiving as input PUCCH number #2 from deciding section 208, control section 209 sets ZC #4 in spreading section 214 and W #0 in spreading section 217. Also, for example, upon receiving as input PUCCH number #4 from deciding section 208, control section 209 sets ZC #1 in spreading section 214 and W #1 in spreading section 217.

Here, in FIG. 7, ZC sequences for first spreading when using W #1 in second spreading (i.e. ZC #1, ZC #5 and ZC #9) are acquired by cyclically shifting the ZC sequences for first spreading when using W #0 in second spreading (i.e. ZC #0, ZC #4 and ZC #8) by one. Also, ZC sequences for first spreading when using W #2 in second spreading (i.e. ZC #2, ZC #6 and ZC #10) are acquired by cyclically shifting the ZC sequences for first spreading when using W #1 in second spreading (i.e. ZC #1, ZC #5 and ZC #9) by one. Also, ZC sequences for first spreading when using W #3 in second spreading (i.e. ZC #3, ZC #7 and ZC #11) are acquired by cyclically shifting the ZC sequences for first spreading when using W #2 in second spreading (i.e. ZC #2, ZC #6 and ZC #10) by one.

Also, in FIG. 7, the difference between the cyclic shift values of ZC sequences associated with different, adjacent Walsh sequences, is less than the difference between the cyclic shift values of ZC sequences associated with the same Walsh sequence. For example, while the cyclic shift value difference is 1 between ZC #0 associated with W #0 and ZC #1 associated with W #1, the cyclic shift value difference is 4 between ZC #0 and ZC #4 associated with W #0.

Thus, in FIG. 7, ZC sequences are cyclically shifted by one every time the Walsh sequence number increases by one. That is, in the present embodiment, the minimum difference is 1 between the cyclic shift values of ZC sequences associated with adjacent Walsh sequences. In other words, in FIG. 7, adjacent Walsh sequences are associated with ZC sequences, cyclic shift values of which are different, and used for two-dimensional spreading for response signals. Therefore, even when inter-code interference between Walsh sequences occurs due to the collapse of orthogonality between the Walsh sequences, it is possible to suppress inter-code interference by spreading using ZC sequences. For example, referring to FIG. 7, a response signal that is transmitted using PUCCH #4 is subjected to two-dimensional spreading using ZC #1 and W #1, and a response signal that is transmitted using PUCCH #7 is subjected to two-dimensional spreading using ZC #2 and W #2. Therefore, even when inter-code interference between W #1 and W #2 occurs due to the collapse of orthogonality between W #1 and W #2, it is possible to suppress the inter-code interference by a slight difference between the cyclic shift values of ZC #1 and ZC #2.

On the other hand, in FIG. 7, like ZC #1 and ZC #2, ZC sequences, cyclic shift values of which are adjacent, that is, ZC sequences, between which the cyclic shift value difference is "1," are used. By this means, orthogonality between ZC sequences may collapse, which causes inter-code interference between the ZC sequences. However, in FIG. 7, ZC sequences, between which a cyclic shift value difference is "1," are associated with different Walsh sequences and used for two-dimensional spreading of response signals. Therefore, even when inter-code interference between ZC sequences occurs due to the collapse of orthogonality between the ZC sequences, it is possible to suppress inter-code interference by spreading using Walsh sequences. For example, referring to FIG. 7, a response signal that is transmitted using PUCCH #4 is subjected to two-dimensional spreading using ZC #1 and W #1, and a response signal that is transmitted using PUCCH #7 is subjected to two-dimensional spreading using ZC #2 and W #2. Therefore, even when inter-code interference between ZC #1 and ZC #2 occurs, it is possible to suppress inter-code interference by the difference between the sequences of W #1 and W #2.

Thus, the present embodiment absorbs the collapse of orthogonality on the Walsh axis (i.e. inter-code interference between Walsh sequences), on the cyclic shift axis, and absorbs the collapse of orthogonality on the cyclic shift axis (i.e. inter-code interference between ZC sequences), on the Walsh axis. In other words, the present embodiment compensates inter-code interference between Walsh sequences caused by the collapse of orthogonality between the Walsh sequences, by the spreading gain of ZC sequence, and compensates inter-code interference between ZC sequences caused by the collapse of orthogonality between the ZC sequences, by the spreading gain of Walsh sequence. Therefore, according to the present embodiment, it is possible to minimize degradation of the separation performance of code-multiplexed response signals.

Figure 8:
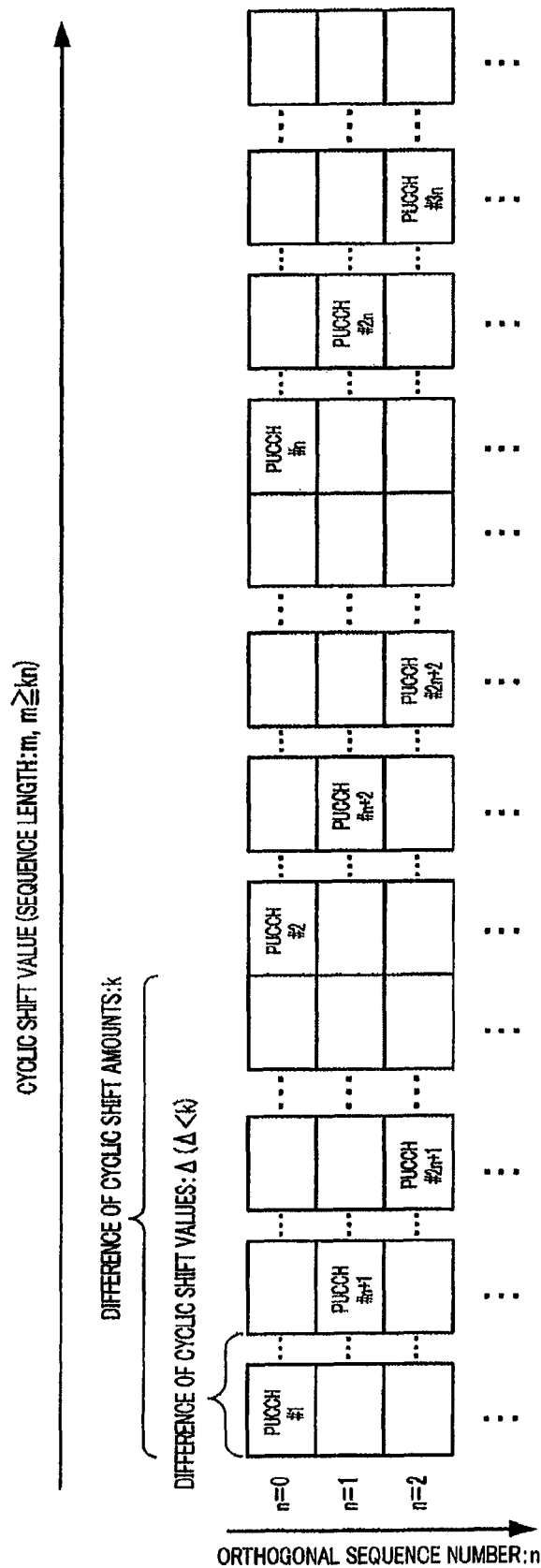
FIG. 8 is a diagram showing association between the first sequences, second sequences and PUCCHs according to Embodiment 1 of the present invention.

FIG. 8 generalizes the association shown in FIG. 7. That is, FIG. 8 illustrates a case where signals are spread using a plurality of first sequences that can be separated from each other because of different cyclic shift values and a plurality of orthogonal second sequences. That is, according to FIG. 8, when the difference between the cyclic shift values of a plurality of first sequences associated with the same second sequence is "k," the difference between the cyclic shift values of a plurality of first sequences associated with a plurality of adjacent second sequences is "Δ" (Δ<k). That is, in FIG. 8, the first sequences are shifted by Δ every time the second sequence number increases by one.

Also, as described above, the present embodiment can compensate inter-code interference between Walsh sequences by the spreading gain of ZC sequence, and compensate inter-code interference between ZC sequences by the spreading gain of Walsh sequence. Therefore, it is possible to make the difference between the cyclic shift values of ZC sequences associated with the same Walsh sequence less than "4" in FIG. 7. FIG. 9 illustrates a case where this difference is "2." While twelve PUCCHs of PUCCH #1 to PUCCH #12 are available in FIG. 7, twenty-four PUCCHs of PUCCH #1 to PUCCH #24 are available in FIG. 9. In other words, while twelve code resources amongst forty-eight code resources are used in FIG. 7, twenty-four code resources amongst forty-eight coded resources are used in FIG. 9. That is, the present embodiment can increase the efficiency of use of limited code resources and maximize the efficiency of use of code resources.

Also, if the association shown in FIG. 10 are used, it is equally possible to produce the same effect as in the case of using the association shown in FIG. 9.

(Embodiment 2)

Figure 11:
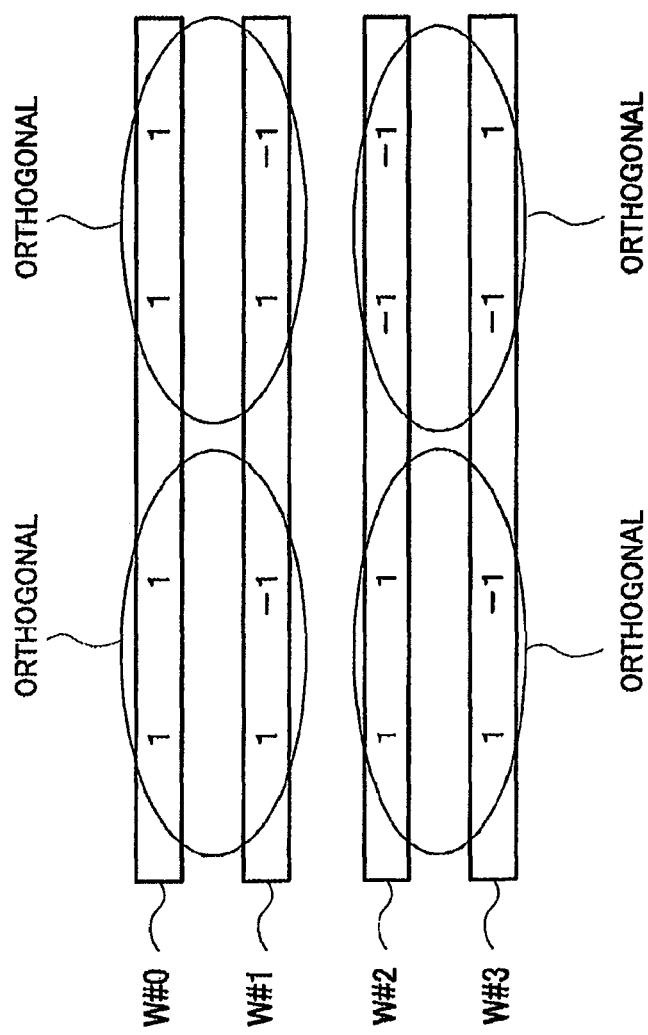
FIG. 11 illustrates Walsh sequences according to Embodiment 2 of the present invention.

As shown in FIG. 11, when W #0 is (1, 1, 1, 1) and W #1 is (1, −1, 1, −1), the first two-chip units in W #0 and W #1 are orthogonal to each other, and the second two-chip units are orthogonal to each other. Similarly, when W #2 is (1, 1, −1, −1) and W #3 is (1, −1, −1, 1), the first two-chip units in W #2 and W #3 are orthogonal to each other, and the second two-chip units are orthogonal to each other. Therefore, if the change of channel condition is sufficiently small during two symbol time periods, inter-code interference do not occur between W #0 and W #1 and inter-code interference do not occur between W #2 and W #3. Therefore, it is possible to separate a plurality of response signals subjected to code-multiplexing by second spreading using W #0 and W #1, into the first two-chip units and the second two-chip units. Similarly, it is possible to separate a plurality of response signals subjected to code multiplexing by second spreading using W #2 and W #3, into the first two-chip units and the second two-chip units.

Therefore, with the present embodiment, control section 209 controls the cyclic shift value of a ZC sequence that is used for first spreading in spreading section 214 and a Walsh sequence that is used for second spreading in spreading section 217 according to the association shown in FIG. 12. In FIG. 12, the cyclic shift values of ZC sequences associated with W #0 and the cyclic shift values of ZC sequences associated with W #1 are the same in 0, 2, 4, 6, 8 and 10, and the cyclic shift values of ZC sequences associated with W #2 and the cyclic shift values of ZC sequences associated with W #3 are the same in 1, 3, 5, 7, 9 and 11.

Here, for example, to separate the response signal subjected to second spreading by W #0 when W #0, W #1 and W #2 are used for second spreading at the same time, the sum of $S_0$, $S_1$, $S_2$ and $S_3$ in FIG. 1 is calculated. By this means, it is possible to remove the response signal components spread by W #1 and W #2, from a received signal. However, if a mobile station that uses W #1 and a mobile station that uses W #2 move fast, the difference by channel variation is remained in a separated response signal as inter-code interference.

That is, referring to W #1, $S_0$ and $S_1$ have different signs, and therefore the response signal component spread by W #1 is removed by adding $S_0$ and $S_1$. But, inter-code interference of Δ#1 by channel variation is remained in the separated response signal. If the channel variation is linear, similarly, inter-code interference of Δ#1 is remained in the separated response signal between S₂ and S₃. Therefore, inter-code interference of 2×Δ#1 in total is remained in the separated response signal.

On the other hand, referring to W #2, S₀ and S₁ have the same sign, and therefore response signal components spread by W #2 are removed by the difference between the signs of S₂ and S₃. In this case, inter-code interference of 4×Δ#2 in total is remained in the separated response signal.

That is, inter-code interference is reduced between a plurality of response signals subjected to code-multiplexing using a plurality of Walsh sequences between which the first two-chip units are orthogonal to each other and the second two-chip units are orthogonal to each other. Therefore, the present embodiment uses different Walsh sequences with little inter-code interference (e.g. W #0 and W #1) in combination with ZC sequences, cyclic shift values of which are the same, and uses different Walsh sequences with significant inter-code interference (e.g. W #0 and W #2) in combination with ZC sequences, cyclic shift values of which are different.

As described above, according to the present embodiment, by performing second spreading of response signals using Walsh sequences in which parts of the sequences shorter than the sequence length are orthogonal to each other, it is possible to improve the robustness to fast movement of mobile stations.

(Embodiment 3)

In code multiplexing by first spreading using ZC sequences, that is, in code multiplexing on the cyclic shift axis, as described above, a sufficient difference is provided between the cyclic shift values of ZC sequences, to an extent that does not cause inter-code interference between the ZC sequences. Therefore, orthogonality between ZC sequences is little likely to collapse. Also, even if there is a mobile station that moves fast, orthogonality between ZC sequences does not collapse. On the other hand, in code-multiplexing by second spreading using Walsh sequences, that is, in code-multiplexing on the Walsh axis, as described above, orthogonality between Walsh sequences is likely to collapse when there is a mobile station that moves fast. Therefore, upon code-multiplexing response signals by second spreading, it may be preferable to increase the average multiplexing level on the cyclic shift axis where orthogonality is little likely to collapse, and decrease the average multiplexing level on the Walsh axis where orthogonality is likely to collapse. Also, it may be preferable to equalize (unify) the multiplexing level on the Walsh axis between ZC sequences, such that the multiplexing level on the Walsh axis is not extremely high only in the response signal subjected to first spreading by a certain ZC sequence. That is, when a response signal is subject to two-dimensional spreading on both the cyclic shift axis and the Walsh axis, it may be preferable to reduce the average multiplexing level on the Walsh axis and equalize (unify) the multiplexing levels on the Walsh axis between ZC sequences.

Figure 13:
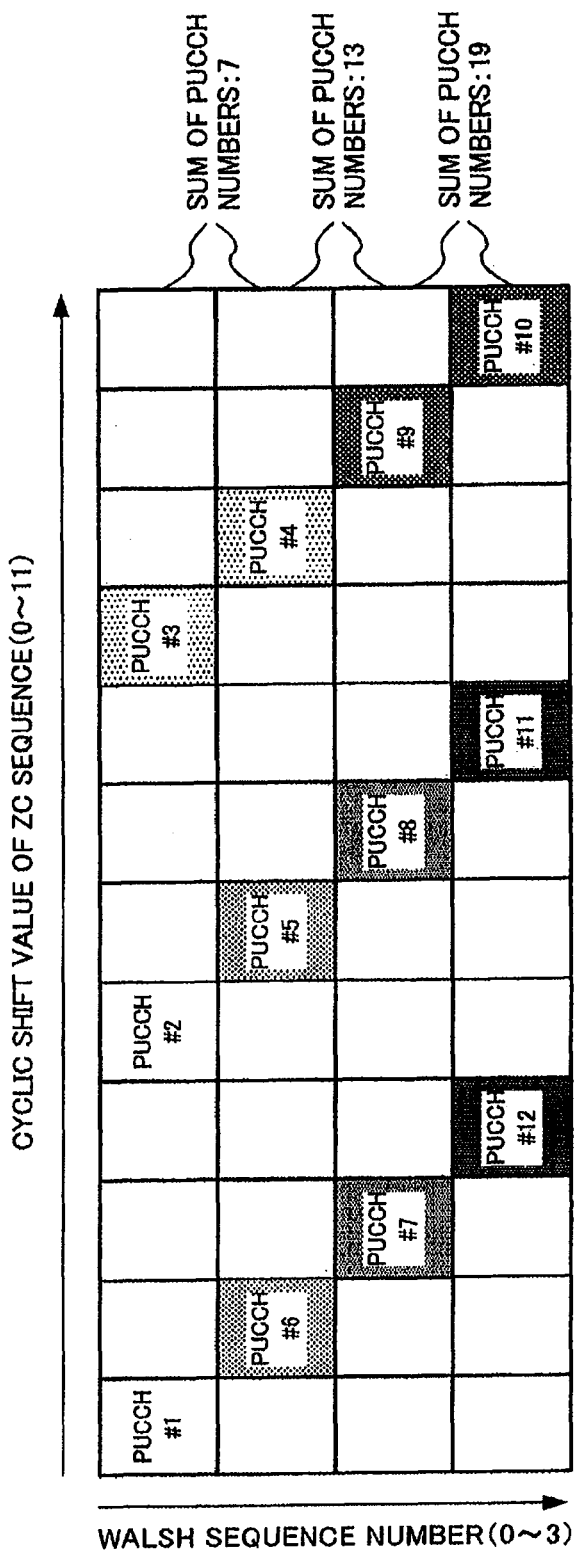
FIG. 13 is a diagram showing association between ZC sequences, Walsh sequences and PUCCHs according to Embodiment 3 of the present invention (variation 1)

That is, the present embodiment controls ZC sequences and Walsh sequences based on the association shown in FIG. 13. That is, control section 209 controls the cyclic shift value of a ZC sequence that is used for first spreading in spreading section 214 and a Walsh sequence that is used for second spreading in spreading section 217 based on the association shown in FIG. 13.

Here, in CCE #1 to CCE #12 associated with PUCCH #1 to PUCCH #12 shown in FIG. 13, probability P to use physical resources for response signals (i.e. physical resources for PUCCH) corresponding to the CCE numbers or the priority level of CCEs decreases in order from CCE #1, CCE #2, . . . , CCE #11 and CCE #12. That is, when the CCE number increases, the above probability P monotonically decreases. Therefore, the present embodiment associates PUCCHs with ZC sequences and Walsh sequences, as shown in FIG. 13.

That is, referring to the first and second rows along the Walsh axis (i.e. W #0 and W #1) in FIG. 13, PUCCH #1 and PUCCH #6 are multiplexed, and PUCCH #2 and PUCCH #5 are multiplexed. Therefore, the sum of the PUCCH numbers of PUCCH #1 and PUCCH #6, "7," is equal to the sum of the PUCCH numbers of PUCCH #2 and PUCCH #5, "7." That is, on the Walsh axis, PUCCHs of low numbers and PUCCHs of high numbers are associated and allocated. The same applies to PUCCH #3, PUCCH #4, and PUCCH #7 to PUCCH #12. Further, the same applies to the third row (W #2) and fourth row (W #3) on the Walsh axis. That is, in FIG. 13, between adjacent ZC sequences, the sum of the PUCCH numbers (i.e. the sum of the CCE numbers) of adjacent Walsh sequences is equal. Therefore, in FIG. 13, the average multiplexing levels on the Walsh axis are substantially equal (substantially uniform).

Figure 14:
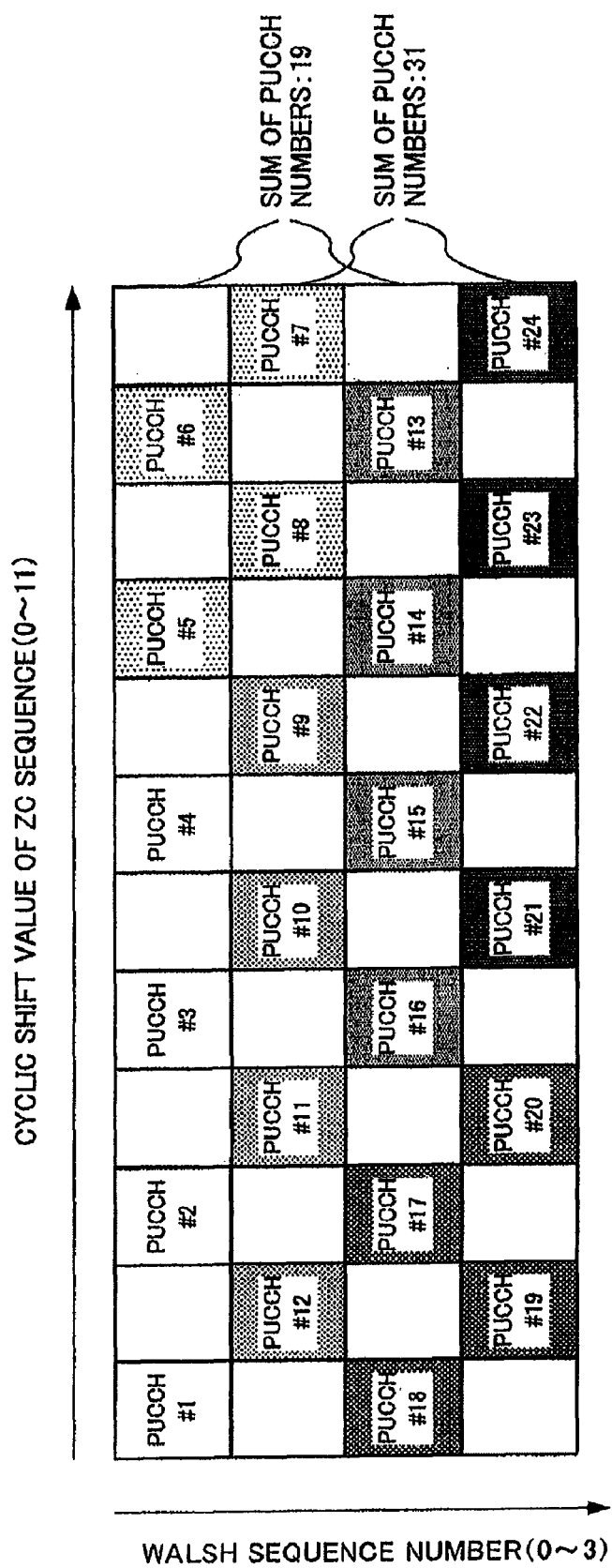
FIG. 14 is a diagram showing association between ZC sequences, Walsh sequences and PUCCHs according to Embodiment 3 of the present invention (variation 2)

Also, to equalize (unify) the multiplexing level on the Walsh axis between ZC sequences when the difference between the cyclic shift values of ZC sequences associated with the same Walsh sequence is "2" (in FIG. 9), it is preferable to control ZC sequences and Walsh sequences based on the association shown in FIG. 14.

In CCE #1 to CCE #24 associated with PUCCH #1 to PUCCH #24 shown in FIG. 14, probability P to use physical resources for response signals corresponding to the CCE numbers or the priority level of CCEs decreases in order from CCE #1, CCE #2, . . . , CCE #23 and CCE #24. That is, as described above, when the CCE number increases, the above probability P monotonically decreases.

Referring to the first and third rows on the Walsh axis (i.e. W #0 and W #2) in FIG. 14, PUCCH #1 and PUCCH #18 are multiplexed, and PUCCH #2 and PUCCH #17 are multiplexed. Therefore, the sum of the PUCCH numbers of PUCCH #1 and PUCCH #18, "19," is equal to the sum of the PUCCH numbers of PUCCH #2 and PUCCH #17, "19." Also, referring to the second and fourth rows along the Walsh axis (i.e. W #1 and W #3) in FIG. 14, PUCCH #12 and PUCCH #19 are multiplexed, and PUCCH #11 and PUCCH #20 are multiplexed. Therefore, the sum of the PUCCH numbers of PUCCH #12 and PUCCH #19, "31," is equal to the sum of the PUCCH numbers of PUCCH #11 and PUCCH #20, "31". That is, on the Walsh axis, PUCCHs of low numbers and PUCCHs of the high numbers are associated and allocated. The same applies to PUCCH #3 to PUCCH #10, PUCCH #13 to PUCCH #16 and PUCCH #21 to PUCCH #24. That is, in FIG. 14, similar to FIG. 13, between adjacent ZC sequences, the sum of the PUCCH numbers (i.e. the sum of the CCE numbers) of adjacent Walsh sequences is equal. Therefore, in FIG. 14, similar to FIG. 13, the average multiplexing levels on the Walsh axis are substantially equal (substantially uniform).

Thus, the present embodiment associates PUCCHs (i.e., CCEs) with sequences that are used for two-dimensional spreading, based on probability P to use physical resources for response signals corresponding to the CCE numbers or the priority level of CCEs. By this means, the average multiplexing level on the Walsh axis, that is, the expected values of the number of multiplexed PUCCHs on the Walsh axis are substantially equal (or substantially uniform). Thus, according to the present embodiment, the multiplexing level on the Walsh axis is not extremely high only in a response signal subjected to first spreading by a certain ZC sequence, so that it is possible to minimize the influence when orthogonality between Walsh sequences collapses. Therefore, according to the present embodiment, it is possible to further suppress the degradation of the separation performance of response signals subjected to code-multiplexing by second spreading.

Embodiments of the present invention have been described above.

Also, FIG. 7, FIG. 9, FIG. 10, FIG. 12, FIG. 13 and FIG. 14 illustrate a case of using four Walsh sequences of W #0 to W #3. But, in case of using two, three, five or more Walsh sequences, it is equally possible to implement the present invention in the same way as above.

Also, the above embodiment shows a configuration to compensate inter-code interference between Walsh sequences by the spreading gain of ZC sequence. But, the present invention is applicable not only to cases where complete orthogonal sequences such as Walsh sequences are used for second spreading, but is also to cases where, for example, incomplete orthogonal sequences such as PN sequences are used for second spreading. In this case, inter-code interference due to the incomplete orthogonality of PN sequences is compensated by a spreading gain of ZC sequence. That is, the present invention is applicable to any radio communication apparatuses that use sequences, which can be separated from each other because of different cyclic shift values, for first spreading and sequences, which can be separated because of differences of sequences, for second spreading.

Figure 15:
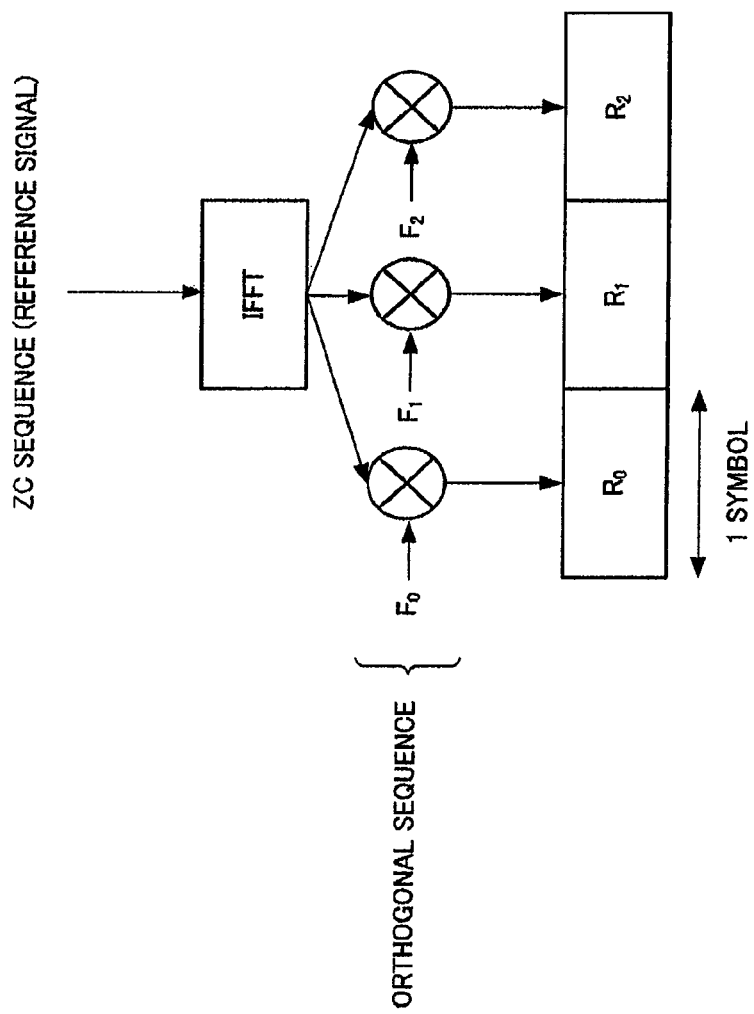
FIG. 15 is a diagram showing a spreading method of a reference signal.

Also, a case has been described above with the embodiments where a plurality of response signals from a plurality of mobile stations are code-multiplexed. But, it is equally possible to implement the present invention even when a plurality of reference signals (e.g. pilot signals) from a plurality of mobile stations are code-multiplexed. As shown in FIG. 15, when three symbols of reference signals $R_0$, $R_1$ and $R_2$, are generated from a ZC sequence (with a sequence length of 12), first, the ZC sequence is subjected to an IFFT in association with orthogonal sequences ($F_0$, $F_1$, $F_2$) with a sequence length of 3. By this IFFT, it is possible to acquire a ZC sequence with a sequence length of 12 in the time domain. Then, the signal subjected to an IFFT is spread using orthogonal sequences ($F_0$, $F_1$, $F_2$). That is, one reference signal (i.e. ZC sequence) is allocated to three symbols $R_0$, $R_1$ and $R_2$. Similarly, other mobile stations allocate one reference signal (i.e. ZC sequence) to three symbols $R_0$, $R_1$ and $R_2$. Here, individual mobile stations use ZC sequences, cyclic shift values of which are different in the time domain, or different orthogonal sequences. Here, the sequence length of ZC sequences in the time domain is 12, so that it is possible to use twelve ZC sequences with cyclic shift values "0" to "11," generated from the same ZC sequence. Also, the sequence length of orthogonal sequences is 3, so that it is possible to use three different orthogonal sequences. Therefore, in an ideal communication environment, it is possible to code-multiplex maximum thirty-six (12×3) reference signals from mobile stations.

Also, a PUCCH used in the above-described embodiments is a channel to feed back an ACK or NACK, and therefore may be referred to as an "ACK/NACK channel."

Also, a mobile station may be referred to as "UE," a base station may be referred to as "Node B," and a subcarrier may be referred to as a "tone." Also, a CP may be referred to as a "GI (Guard Interval)."

Also, the method of detecting an error is not limited to a CRC.

Also, a method of performing transformation between the frequency domain and the time domain is not limited to IFFT and FFT.

Also, a case has been described with the above-described embodiments where the present invention is applied to mobile stations. But, the present invention is also applicable to a fixed radio communication terminal apparatus in a stationary state and a radio communication relay station apparatus that performs the same operations with a base station as a mobile station. That is, the present invention is applicable to all radio communication apparatuses.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2007-159580, filed on Jun. 15, 2007, and Japanese Patent Application No. 2007-161966, filed on Jun. 19, 2007, including the specifications, drawings and abstracts, are incorporated herein by reference in their entireties.

INDUSTRIAL APPLICABILITY

The present invention is applicable to, for example, mobile communication systems.

The invention claimed is:

1. A radio communication apparatus comprising:
a spreading unit configured to spread an ACK or NACK with an orthogonal sequence, which is one of plural orthogonal sequences, and with a sequence defined by a cyclic shift value, which is one of plural cyclic shift values and which is associated with the orthogonal sequence; and
a transmitting unit configured to transmit the ACK or NACK,
wherein:
each of the plural orthogonal sequences is an orthogonal sequence comprised of 4 codes and having a length 4;
the plural orthogonal sequences include a first orthogonal sequence and a second orthogonal sequence, wherein a sequence comprised of 2 codes in the first half of the first orthogonal sequence is not orthogonal to a sequence comprised of 2 codes in the first half of the second orthogonal sequence, and a sequence comprised of 2 codes in the second half of the first orthogonal sequence is not orthogonal to a sequence comprised of 2 codes in the second half of the second orthogonal sequence; and
a cyclic shift value associated with the first orthogonal sequence is different from a cyclic shift value associated with the second orthogonal sequence.
2. The radio communication apparatus according to claim 1, wherein:
the plural orthogonal sequences further include a third orthogonal sequence, wherein a sequence comprised of 2 codes in the first half of the second orthogonal sequence is orthogonal to a sequence comprised of 2 codes in the first half of the third orthogonal sequence, and a sequence comprised of 2 codes in the second half of the second orthogonal sequence is orthogonal to a sequence comprised of 2 codes in the second half of the third orthogonal sequence; and a cyclic shift value associated with the second orthogonal sequence is the same as a cyclic shift value associated with the third orthogonal sequence.

3. A radio communication apparatus comprising:

a spreading unit configured to spread an ACK or NACK with an orthogonal sequence, which is one of plural orthogonal sequences, and with a sequence defined by a cyclic shift value, which is one of plural cyclic shift values and which is associated with the orthogonal sequence; and a transmitting unit configured to transmit the ACK or NACK, wherein:

each of the plural orthogonal sequences is an orthogonal sequence comprised of 4 codes and having a length 4;

the plural orthogonal sequences include a first orthogonal sequence, a second orthogonal sequence and a third orthogonal sequence, wherein a sequence comprised of 2 codes in the first half of the first orthogonal sequence is not orthogonal to a sequence comprised of 2 codes in the first half of the second orthogonal sequence, a sequence comprised of 2 codes in the second half of the first orthogonal sequence is not orthogonal to a sequence comprised of 2 codes in the second half of the second orthogonal sequence, a sequence comprised of 2 codes in the first half of the first orthogonal sequence is orthogonal to a sequence comprised of 2 codes in the first half of the third orthogonal sequence, a sequence comprised of 2 codes in the second half of the first orthogonal sequence is orthogonal to a sequence comprised of 2 codes in the second half of the third orthogonal sequence, a sequence comprised of 2 codes in the first half of the second orthogonal sequence is orthogonal to a sequence comprised of 2 codes in the first half of the third orthogonal sequence, and a sequence comprised of 2 codes in the second half of the second orthogonal sequence is orthogonal to a sequence comprised of 2 codes in the second half of the third orthogonal sequence;

a cyclic shift value associated with the first orthogonal sequence is different from a cyclic shift value associated with the second orthogonal sequence; and a cyclic shift value associated with the first orthogonal sequence or the second orthogonal sequence is the same as a cyclic shift value associated with the third orthogonal sequence.

4. A radio communication apparatus comprising:

a spreading unit configured to spread an ACK or NACK with an orthogonal sequence, which is one of plural orthogonal sequences, and with a sequence defined by a cyclic shift value, which is one of plural cyclic shift values and which is associated with the orthogonal sequence; and a transmitting unit configured to transmit the ACK or NACK, wherein:

each of the plural orthogonal sequences is expressed as $[W_0, W_1, W_2, W_3]$;

the plural orthogonal sequences include a first orthogonal sequence and a second orthogonal sequence, wherein $[W_0, W_1]$ of the first orthogonal sequence and $[W_0, W_1]$ of the second orthogonal sequence are not orthogonal, and $[W_2, W_3]$ of the first orthogonal sequence and $[W_2, W_3]$ of the second orthogonal sequence are not orthogonal; and a cyclic shift value associated with the first orthogonal sequence is different from a cyclic shift value associated with the second orthogonal sequence.

5. The radio communication apparatus according to claim 4, wherein:

the plural orthogonal sequences further include a third orthogonal sequence, wherein $[W_0, W_1]$ of the second orthogonal sequence and $[W_0, W_1]$ of the third orthogonal sequence are orthogonal, and $[W_2, W_3]$ of the second orthogonal sequence and $[W_2, W_3]$ of the third orthogonal sequence are orthogonal; and a cyclic shift value associated with the second orthogonal sequence is the same as a cyclic shift value associated with the third orthogonal sequence.

6. A radio communication apparatus comprising:

a spreading unit configured to spread an ACK or NACK with an orthogonal sequence, which is one of plural orthogonal sequences, and with a sequence defined by a cyclic shift value, which is one of plural cyclic shift values and which is associated with the orthogonal sequence; and a transmitting unit configured to transmit the ACK or NACK, wherein:

each of the plural orthogonal sequences is expressed as $[W_0, W_1, W_2, W_3]$;

the plural orthogonal sequences include a first orthogonal sequence, a second orthogonal sequence and a third orthogonal sequence, wherein $[W_0, W_1]$ of the first orthogonal sequence and $[W_0, W_1]$ of the second orthogonal sequence are not orthogonal, $[W_2, W_3]$ of the first orthogonal sequence and $[W_2, W_3]$ of the second orthogonal sequence are not orthogonal, $[W_0, W_1]$ of the first orthogonal sequence and $[W_0, W_1]$ of the third orthogonal sequence are orthogonal, $[W_2, W_3]$ of the first orthogonal sequence and $[W_2, W_3]$ of the third orthogonal sequence are orthogonal, $[W_0, W_1]$ of the second orthogonal sequence and $[W_0, W_1]$ of the third orthogonal sequence are orthogonal, and $[W_2, W_3]$ of the second orthogonal sequence and $[W_2, W_3]$ of the third orthogonal sequence are orthogonal;

a cyclic shift value associated with the first orthogonal sequence is different from a cyclic shift value associated with the second orthogonal sequence; and a cyclic shift value associated with the first orthogonal sequence or the second orthogonal sequence is the same as a cyclic shift value associated with the third orthogonal sequence.

7. The radio communication apparatus according to claim 6, wherein $W_n$ (n=0~3) is 1 or −1.

8. The radio communication apparatus according to claim 4, wherein:

the plural cyclic shift values include a plurality of first cyclic shift values and a plurality of second cyclic shift values that are different from the plurality of first cyclic shift values; and the first orthogonal sequence is associated with the plurality of first cyclic shift values, and the second orthogonal sequence is associated with the plurality of second cyclic shift values.

9. The radio communication apparatus according to claim 5, wherein:
the plural cyclic shift values include a plurality of first cyclic shift values and a plurality of second cyclic shift values that are different from the plurality of first cyclic shift values; and
the first orthogonal sequence is associated with the plurality of first cyclic shift values, and the second orthogonal sequence and the third orthogonal sequence are associated with the plurality of second cyclic shift values.

10. The radio communication apparatus according to claim 6, wherein:
the plural cyclic shift values include a plurality of first cyclic shift values and a plurality of second cyclic shift values that are different from the plurality of first cyclic shift values; and
the first orthogonal sequence is associated with the plurality of first cyclic shift values, the second orthogonal sequence is associated with the plurality of second cyclic shift values, and the third orthogonal sequence is associated with the plurality of first cyclic shift values or the plurality of second cyclic shift values.

11. The radio communication apparatus according to claim 8, wherein:
the plural cyclic shift values are comprised of 12 cyclic shift values, which cyclically shift from each other by a predefined unit;
the plurality of first cyclic shift values are comprised of 6 cyclic shift values, which are out of the plural cyclic shift values and which cyclically shift from each other by two of the units; and
the plurality of second cyclic shift values are comprised of 6 cyclic shift values, which are out of the plural cyclic shift values and are exclusive of the plurality of first cyclic shift values and which cyclically shift from each other by two of the units.

12. A radio communication apparatus comprising:
a spreading unit configured to spread an ACK or NACK with an orthogonal sequence, which is one of plural orthogonal sequences, and with a sequence defined by a cyclic shift value, which is one of plural cyclic shift values and which is associated with the orthogonal sequence; and
a transmitting unit configured to transmit the ACK or NACK,
wherein, the plural orthogonal sequences include a first orthogonal sequence [1, −1, 1, −1] and a second orthogonal sequence [1, −1, −1, 1], and a cyclic shift value associated with the first orthogonal sequence is different from a cyclic shift value associated with the second orthogonal sequence.

13. The radio communication apparatus according to claim 12, wherein the plural orthogonal sequences include a third orthogonal sequence [1, 1, 1, 1], and a cyclic shift value associated with the second orthogonal sequence is different from a cyclic shift value associated with the third orthogonal sequence.

14. A radio communication apparatus comprising:
a spreading unit configured to spread an ACK or NACK with an orthogonal sequence, which is one of plural orthogonal sequences, and with a sequence defined by a cyclic shift value, which is one of plural cyclic shift values and which is associated with the orthogonal sequence; and
a transmitting unit configured to transmit the ACK or NACK,
wherein:
the plural orthogonal sequences include a first orthogonal sequence [1, −1, 1, −1], a second orthogonal sequence [1, −1, −1, 1] and a third orthogonal sequence [1, 1, 1, 1];
a cyclic shift value associated with the first orthogonal sequence is different from a cyclic shift value associated with the second orthogonal sequence; and
a cyclic shift value associated with the first orthogonal sequence or the second orthogonal sequence is the same as a cyclic shift value associated with the third orthogonal sequence.

15. The radio communication apparatus according to claim 12, wherein:
the plural cyclic shift values include a plurality of first cyclic shift values and a plurality of second cyclic shift values that are different from the plurality of first cyclic shift values; and
the first orthogonal sequence is associated with the plurality of first cyclic shift values, and the second orthogonal sequence is associated with the plurality of second cyclic shift values.

16. The radio communication apparatus according to claim 13, wherein:
the plural cyclic shift values include a plurality of first cyclic shift values and a plurality of second cyclic shift values that are different from the plurality of first cyclic shift values; and
the third orthogonal sequence is associated with the plurality of first cyclic shift values, and the second orthogonal sequence is associated with the plurality of second cyclic shift values.

17. The radio communication apparatus according to claim 14, wherein:
the plural cyclic shift values include a plurality of first cyclic shift values and a plurality of second cyclic shift values that are different from the plurality of first cyclic shift values; and
the first orthogonal sequence is associated with the plurality of first cyclic shift values, the second orthogonal sequence is associated with the plurality of second cyclic shift values, and the third orthogonal sequence is associated with the plurality of first cyclic shift values or the plurality of second cyclic shift values.

18. The radio communication apparatus according to claim 15, wherein:
the plural cyclic shift values are comprised of 12 cyclic shift values, which cyclically shift from each other by a predefined unit;
the plurality of first cyclic shift values are comprised of 6 cyclic shift values, which are out of the plural cyclic shift values and which cyclically shift from each other by two of the units; and
the plurality of second cyclic shift values are comprised of 6 cyclic shift values, which are out of the plural cyclic shift values and are exclusive of the plurality of first cyclic shift values and which cyclically shift from each other by two of the units.

19. The radio communication apparatus according to claim 15, wherein a minimum difference between the cyclic shift values that are respectively used for the first orthogonal sequence and the second orthogonal sequence is less than a minimum difference between the cyclic shift values that are used for one of the plural orthogonal sequences.

20. The radio communication apparatus according to claim 18, wherein said transmitting unit transmits the ACK or NACK using a control channel, and said spreading unit uses an orthogonal sequence determined from the control channel and uses a sequence defined by a cyclic shift value that is determined from the control channel.

21. The radio communication apparatus according to claim 20, wherein said transmitting unit transmits the ACK or NACK using a resource, and said spreading unit uses an orthogonal sequence determined from the resource and uses a sequence defined by a cyclic shift value that is determined from the resource.

22. A response signal spreading method comprising:
spreading an ACK or NACK with a sequence defined by a cyclic shift value, which is one of plural cyclic shift values and which is associated with an orthogonal sequence; and
spreading the ACK or NACK with an orthogonal sequence, which is one of plural orthogonal sequences,
wherein:
  each of the plural orthogonal sequences is an orthogonal sequence comprised of 4 codes and having a length 4;
  the plural orthogonal sequences include a first orthogonal sequence and a second orthogonal sequence, wherein a sequence comprised of 2 codes in the first half of the first orthogonal sequence is not orthogonal to a sequence comprised of 2 codes in the first half of the second orthogonal sequence, and a sequence comprised of 2 codes in the second half of the first orthogonal sequence is not orthogonal to a sequence comprised of 2 codes in the second half of the second orthogonal sequence; and
  a cyclic shift value associated with the first orthogonal sequence is different from a cyclic shift value associated with the second orthogonal sequence.

23. A response signal spreading method comprising:
spreading an ACK or NACK with a sequence defined by a cyclic shift value, which is one of plural cyclic shift values and which is associated with an orthogonal sequence; and
spreading the ACK or NACK with an orthogonal sequence, which is one of plural orthogonal sequences,
wherein:
  each of the plural orthogonal sequences is expressed as $[W_0, W_1, W_2, W_3]$;
  the plural orthogonal sequences include a first orthogonal sequence and a second orthogonal sequence, wherein $[W_0, W_1]$ of the first orthogonal sequence and $[W_0, W_1]$ of the second orthogonal sequence are not orthogonal, and $[W_2, W_3]$ of the first orthogonal sequence and $[W_2, W_3]$ of the second orthogonal sequence are not orthogonal; and
  a cyclic shift value associated with the first orthogonal sequence is different from a cyclic shift value associated with the second orthogonal sequence.

24. A response signal spreading method comprising:
spreading an ACK or NACK with a sequence defined by a cyclic shift value, which is one of plural cyclic shift values and which is associated with an orthogonal sequence; and
spreading the ACK or NACK with an orthogonal sequence, which is one of plural orthogonal sequences,
wherein, the plural orthogonal sequences include a first orthogonal sequence [1, −1, 1, −1] and a second orthogonal sequence [1, −1, −1, 1], and a cyclic shift value associated with the first orthogonal sequence is different from a cyclic shift value associated with the second orthogonal sequence.

* * * * *

UNITED STATES PATENT AND TRADEMARK OFFICE
CERTIFICATE OF CORRECTION

PATENT NO.         : 8,199,792 B2                               Page 1 of 1
APPLICATION NO.    : 13/280190
DATED              : June 12, 2012
INVENTOR(S)        : Seigo Nakao et al.

It is certified that error appears in the above-identified patent and that said Letters Patent is hereby corrected as shown below:

Title Page; Col. 2, Item (57) line 13:
"response signal to which PC has been added." should read, --response signal to which CP has been added.--.

Signed and Sealed this
Thirty-first Day of July, 2012

David J. Kappos
*Director of the United States Patent and Trademark Office*